United States Patent
Chesters et al.

(10) Patent No.: US 6,175,913 B1
(45) Date of Patent: Jan. 16, 2001

(54) DATA PROCESSING UNIT WITH DEBUG CAPABILITIES USING A MEMORY PROTECTION UNIT

(75) Inventors: Eric Chesters, Mountain View; Roger D. Arnold, Sunnyvale; Rod G. Fleck, Mountain View, all of CA (US)

(73) Assignee: Siemens AG, Munich (DE)

( * ) Notice: Under 35 U.S.C. 154(b), the term of this patent shall be extended for 0 days.

(21) Appl. No.: 08/928,768

(22) Filed: Sep. 12, 1997

(51) Int. Cl.$^7$ ................................................. G06F 15/00
(52) U.S. Cl. ......................... 712/227; 712/32; 712/37; 712/39; 712/229; 712/231
(58) Field of Search ................. 712/39, 37, 32, 712/227, 229, 231

(56) References Cited

U.S. PATENT DOCUMENTS

| | | | |
|---|---|---|---|
| 5,357,628 | * | 10/1994 | Yuen ..................... 395/575 |
| 5,361,348 | * | 11/1994 | Nakamoto ............. 395/575 |
| 5,394,544 | * | 2/1995 | Motoyama et al. ... 395/575 |
| 5,491,793 | * | 2/1996 | Somasundaram et al. ..... 395/183.21 |
| 5,530,804 | * | 6/1996 | Edgington et al. ............. 395/183.06 |
| 5,621,886 | | 4/1997 | Alpert et al. .......................... 395/500 |
| 5,640,542 | | 6/1997 | Whitsel et al. .................. 395/183.14 |
| 5,828,824 | * | 10/1998 | Swoboda .......................... 395/183.01 |
| 5,838,897 | * | 11/1998 | Bluhm et al. .................... 395/183.06 |
| 5,862,148 | * | 1/1999 | Typaldos et al. ..................... 371/22.1 |

FOREIGN PATENT DOCUMENTS

| | | |
|---|---|---|
| 0 712 078 | 5/1996 | (EP) . |
| 0 762 280 | 3/1997 | (EP) . |
| 0 849 669 | 6/1998 | (EP) . |

* cited by examiner

*Primary Examiner*—John A. Follansbee
*Assistant Examiner*—Dzung C. Nguyen

(57) ABSTRACT

A data processing unit is described which comprises a central processing unit, a bus coupled with the central processing unit to access a device via address and data lines coupled with the bus. A debug unit is coupled to the bus, a protection unit is coupled with the bus and with the debug unit for protecting access on the bus. The protection unit is programmable to operate in a protecting mode in which the bus can be protected and in a debug mode in which a signal is sent to the debug unit, whereupon the debug unit generates a debug signal.

16 Claims, 2 Drawing Sheets

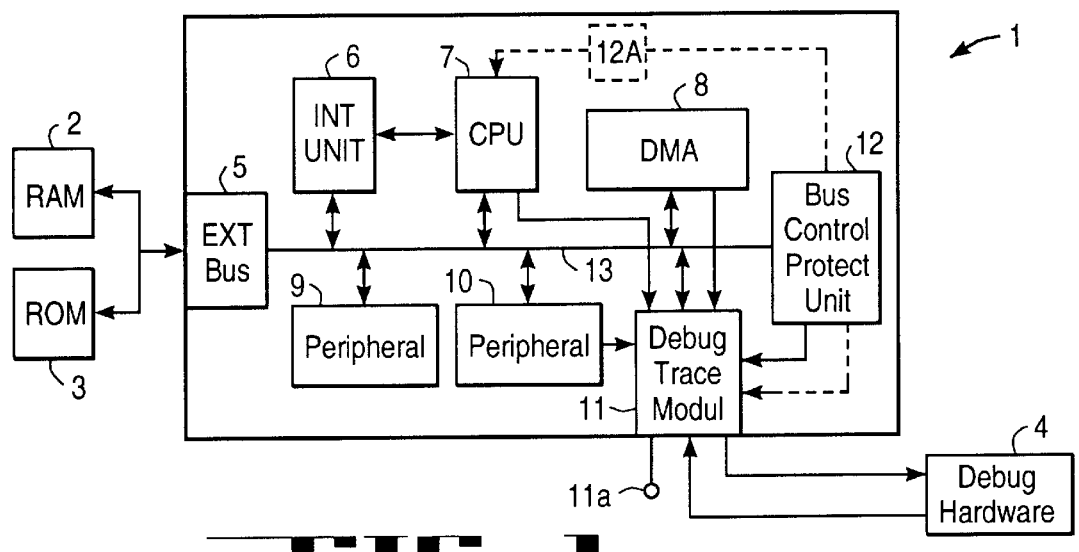
FIG_1
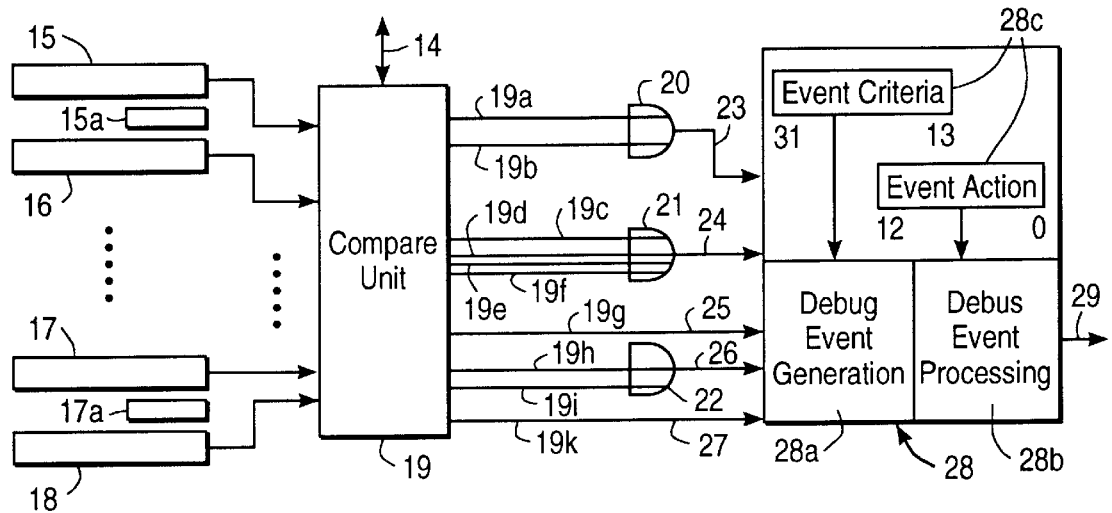
FIG_2
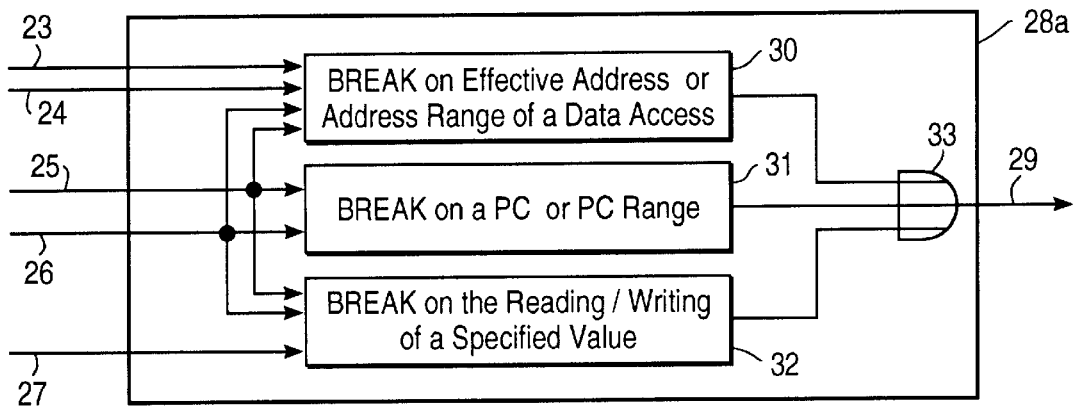
FIG_3

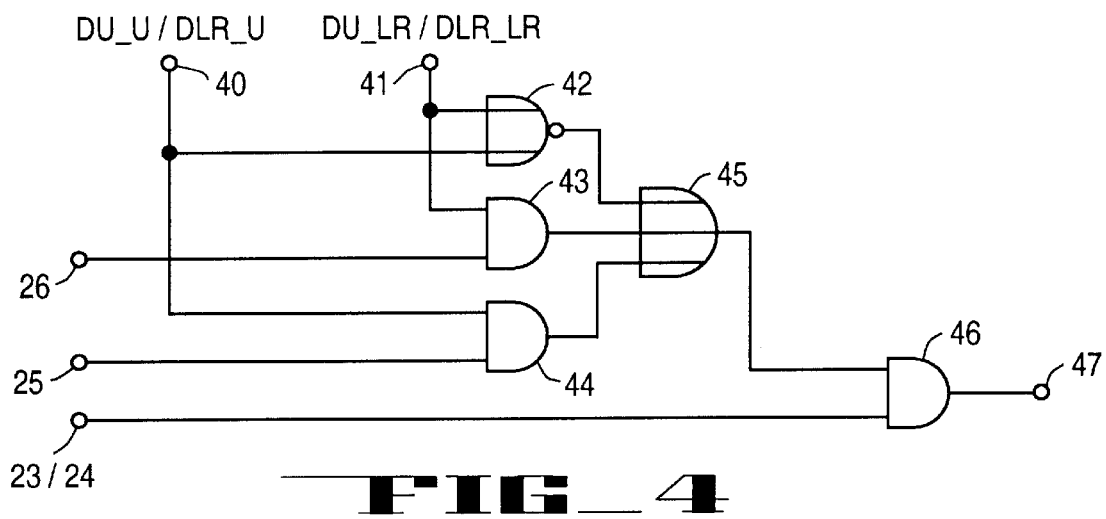
FIG_4
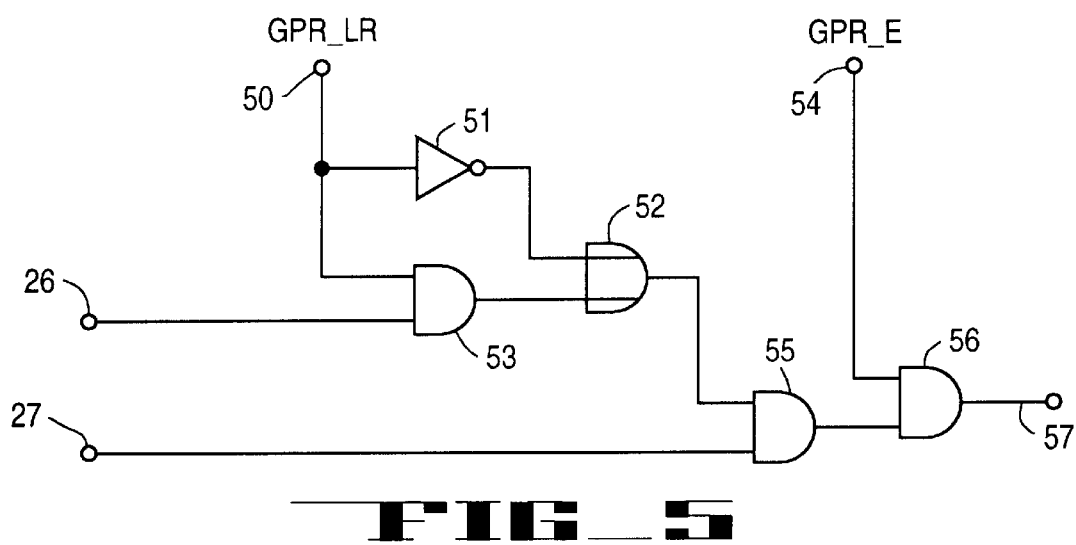
FIG_5
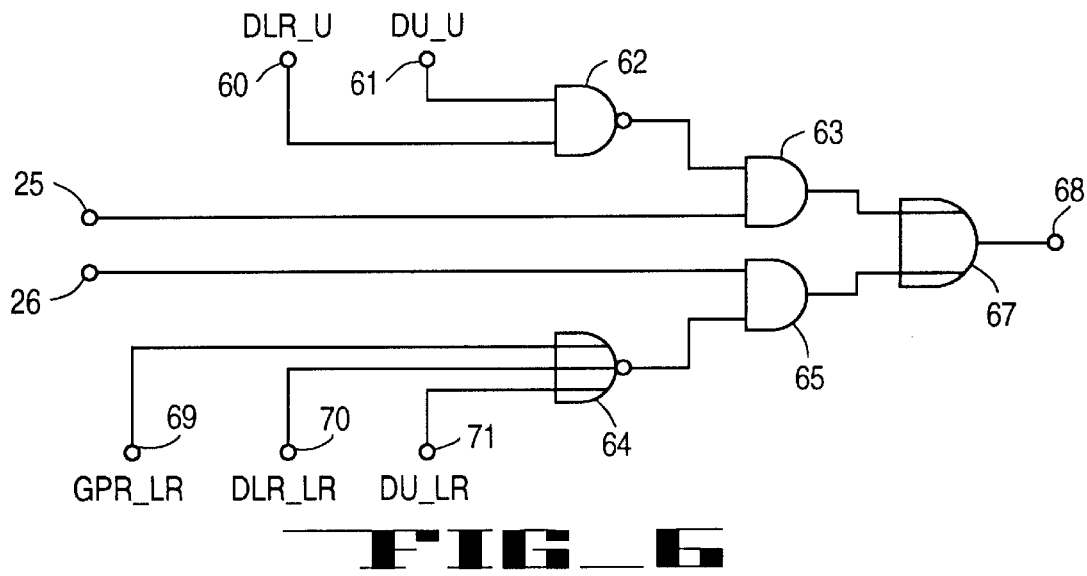
FIG_6

DATA PROCESSING UNIT WITH DEBUG CAPABILITIES USING A MEMORY PROTECTION UNIT

BACKGROUND OF THE INVENTION

The present invention relates to a data processing unit, such as a microprocessor or microcontroller, with debug capabilities. Whereas in the first microprocessor systems debugging of software could only be done by software which did not allow any real time analysis, nowadays microprocessors have special debug hardware on chip. This debug hardware allows to program breakpoints to control the flow of a program which has to be analyzed. Therefore, the breakpoints do not have to be simulated by software anymore, but still even hardware generated breakpoints may interrupt the program and control will be taken by the respective debug software. In many real time applications, program flow may not be interrupted. Thus, for many real time applications an in circuit emulator might still be necessary.

SUMMARY OF THE INVENTION

It is an object of the present invention to provide a data handling unit with additional debug hardware which provides an efficient debug support and minimizes the need of in circuit emulators. This object is achieved by a data processing unit, comprising a central processing unit, a bus coupled with the central processing unit to access a device via address and data lines coupled with the bus, a debug unit being coupled to said bus, a protection unit coupled with the bus and with the debug unit for protecting access on the bus. The protection unit is programmable to operate in a protecting mode in which the bus can be protected and in a debug mode in which a signal is sent to the debug unit, whereupon the debug unit generates a debug signal.

In a further embodiment, the data processing unit further comprises an interrupt controller coupled with an interrupt input of the central processing unit. The debug signal is fed to said interrupt controller and upon a debug event an interrupt is generated. The interrupt can be assigned any priority, thus allowing to service a short debug routine and to avoid interrupting critical real time routines with higher priorities.

BRIEF DESCRIPTION OF THE DRAWINGS

FIG. 1 shows a basic block diagram of a microcontroller system according to the present invention, FIG. 2 shows a block diagram for a basic debug event generating unit, FIG. 3 shows details of a debug event generator, FIG. 4 shows a first logical circuit for generating a debug event, FIG. 5 shows a second logical circuit for generating a debug event, FIG. 6 shows a third logical circuit for generating a debug event.

DESCRIPTION OF THE PREFERRED EMBODIMENT

FIG. 1 shows a microcontroller 1 coupled with a random access memory 2 (RAM) and a read only memory 3 (ROM) via a external bus unit 5. External bus unit 5 is coupled to an internal bus 13 which links all devices of a microcontroller 1. A central processing unit 7 (CPU) and a direct memory access unit 8 (DMA) are coupled to this bus 13. A number of peripheral devices 9 and 10 are also connected to bus 13. An interrupt controller 6 is coupled to the CPU 7 and to bus 13.

A bus control/protection unit 12 handles the timing of the signals on bus 13. It also contains a protection unit which compares data and address lines with predefined values to protect specific address ranges from read or/and write access. The protection unit can also be part of the central processing unit 12 or can be connected to the central processing unit as indicated by numeral 12A. A debug/trace module 11 is coupled with bus 13 and receives signals from CPU 7, DMA 8, peripheral 10, and bus control/protection unit 12. Debug/Trace module 11 comprises an external interface with an input/output pin 11a and coupling lines to an external debug hardware 4.

Bus 13 comprises special debug lines which are used for debug support. Some of these lines can be used to indicate the respective debug level. The value of the current debug level is updated by the on chip debug system and is used by peripherals 8, 9, and 10 to determine what actions should be taken when the CPU 7 enters the debug state. These options can be for example:

Always suspend operation when the debug active signal is asserted;

Never suspend operation when the debug active signal is asserted;

Provide a bit in one of the peripheral control registers which is used to specify whether the peripheral should suspend or not when the debug active signal is asserted.

The current debug level can be held in a special field of a debug status register provided in the debug/trace module 11. The microcontroller 1 according to the present invention provides a special on chip protection unit in bus control unit 12 or a protection unit 12A which is either part of the central processing unit 7 or connected to it, as indicated by the dotted lines in FIG. 1. If this unit 12 is coupled with the bus it can check signals generated by either a CPU 7 or a DMA-unit 8. A protection unit 12A which is part of the CPU 7 can check directly any signals which are generated by the CPU. This protection unit 12, 12A may have a plurality of associated registers 15, 16, . . . 17, and 18 as shown in FIG. 2. Each pair of registers 15, 16 and 17, 18 defines a upper bound and a lower bound. These registers 15–18 are coupled with a compare unit 19 which is connected to bus 13 via lines 14. Compare unit 19 generates a plurality of output signals 19a–19k. Signal 19a is generated when a data read is equal to the upper address in the respective register, for example register 16, 19b when a data write is equal to the upper address, for example in register 15. Signal 19c is generated when a data read is equal to the lower address and signal 19d when a data write is equal to the lower address. Signal 19e is generated when data is read within the address range and signal 19f when data is written within the address range. Signal 19g is generated when a code fetch is equal to the upper address and 19h when a code fetch is equal to the lower address. Finally, signal 19i is generated when the code fetch is within the defined range, and 19k when a write back to the general purpose registers in the file register of the CPU 7 occurs.

Signals 19a and 19b are fed to the inputs of an OR gate 20, which generates an output signal on line 23 which is connected with a debug unit 28. The debug unit 28 comprises a debug event generation unit 28a and a debug event processing unit 28b. Furthermore, it contains at least one or a plurality of special event registers 28c which partly controls the debug event generation unit 28a and partly the debug event processing unit 28b. Signals 19a to 19f are fed to the inputs of an OR gate 21, which generates an output signal on line 24 which is connected with debug event generation unit 28a. Signal 19g is fed to line 25 which is coupled with debug event generation unit 28a. Signals 19h and 19i are fed to the inputs of an OR gate 22, which generates an output signal on line 26 which is connected with debug event generation unit 28a. Signal 19k is fed to line 27 which is coupled with debug event generation unit 28a. Debug unit 28 comprises all the necessary logic and registers to generate a debug event on output 29, which is either coupled with CPU 7 through interrupt unit 6, to external pin 11a, or to debug hardware 4.

In a first mode, each register pair 15, 16 and 17, 18 can define an address range. An additional mode register 15a and 17a defines how the range is protected. The mode registers 15a, 17a contain bits which indicate whether a read, a write or an execute in the specified range will be allowed. A plurality of register pairs can be provided, whereby the register pairs can be used for code and/or data protection.

In a second mode, the register pairs are used by the debug system to control the settings of breakpoints and the flow of a respective program. Therefore, the mode register additionally contains control bits to react on certain conditions if data or code is accessed or executed. These control bits specify, for example, a signal on in-range write or read. If these bits are set, write and read signals will be generated on write or read operations, when the data address falls within the range associated with the mode table entry where the bits are set. This enables tracing, for debug purposes, of write or reads to any address within a specified range. An execute signal bit in code range entries enables single stepping of instructions within the associated range. Additional signals, such as signals on read/write/execute from/to lower/upper bound address, will be generated when an address compares equal to the lower or upper bound, respectively, in the associated range table entry defined by the register pair. These signals enable the range table registers to be used for implementing both data watch points and traditional instruction breakpoints. Table 1 shows the content of a mode register in a data range table and in a code range table.

TABLE 1

| Data range | WE | RE | WS | RS | $WB_L$ | $RB_L$ | $WB_U$ | $RB_U$ |
|---|---|---|---|---|---|---|---|---|
| Address range | XE | | XS | | $B_L$ | | $B_U$ | |

WE—Write Enable
RE—Read Enable
WS—Write Signal (signal on in-range write)
RS—Read Signal (signal on in-range read)
$WB_L$—Write Break Lower (signal on write to LB address)
$RB_L$—Read Break Lower (signal on read from LB address)
$WB_U$—Write Break Upper (signal on write to UB address)
$RB_U$13 Read Break Upper (signal on read from UB address)
XE—Execute Enable
XS—Execute Signal (signal on in-range fetch)
$B_L$—Lower Breakpoint (signal on fetch from LB address)
$B_U$—Upper Breakpoint (signal on fetch from UB address)
These signals are used as debug trigger inputs to the debug unit. What happens in response to any of these signals depends on settings in the debug control register. In general, these options can be:

Ignore the signal
Pass a signal to the real time debug port, but otherwise continue normal execution; or
Trap to the interactive debug kernel.
Hold of CPU Trapping to the interactive debug kernel does not necessarily mean halting the CPU 7 altogether. With debuggers that support multi-task debugging, the normal action on trapping to the debug kernel will be to initiate a message transfer over the debug link to the host machine, notifying the user of the event, suspend the task taking the trap, pending command input from the host, and call the real time operating system task scheduler to continue with execution of other tasks.

In addition to the direct actions listed above, it should be noted that signals can be combined in various ways, under control of the registers in the debug control unit. For example, the debug trace module 11 can be set to generate a debug trap or interrupt when a write to a given address is detected, and the program counter for the write lies within a particular range.

Individual range tables defined by each register pair 15, 16; 17, 18 and associated mode register 15a, 17a can be used for memory protection or for debugging. It would even be possible to use them for both purposes at once.

Debug event generator 28 comprises registers for each possible source of debug events, which define what actions should be taken when that debug event is raised. These registers may also contain extra information about what criteria, such as the combination of debug triggers, must be met for the debug event to be raised. The debug event control registers and the sources of the associated debug events are listed in table 2.

TABLE 2

| Register name | Event source | Extra information |
|---|---|---|
| EXEVT | External break pin asserted | None |
| CREVT | Reading or modifying of a CPU control register | None |
| SWEVT | Execution of a debug instruction | None |
| TRnEVT | Programmable combination of debug triggers | Trigger combination criteria |

The action to be taken when a debug event is raised is defined by the following pieces of information:

The event action to be taken
The interrupt priority level, used for the software debug mode
The system debug level.

This information can be encoded in, for example, 12 bits of the TRnEVT-special register in the following way, shown in table 3:

TABLE 3

| TRnEVT-register | | | | | | |
|---|---|---|---|---|---|---|
| 31–13 | 12 | 5 | 4  3 | 2 | 1 | 0 |
| Event criteria | Software mode interrupt priority | | Debug level | BB M | | Event action |

The event action is used to specify what happens when the associated debug event is raised. The action to be taken can be either: none, software debug mode, halt debug mode, or assert external pin. The BBM bit is used to determine whether a breakpoint is break before make or not. Bits 5 to 12 define the priority level for the interrupt generated for the software debug event. The fact that the interrupt priority is programmable allows many different kinds of debug control. Standard debug control, where the debug unit has complete control over the CPU 7, is set when the debug interrupt has the highest priority. The lower the debug priority the more control is given to the program which is tested. For example, very time critical features which need to run in the background to provide data for some less critical routines can run in the background, while the debug kernel collects data to be tested. In very time critical routines, a analysis with no interference by the debug system is possible. In this case, the debug hardware asserts an external pin 11 a upon a debug event. These features allow a wide variety of debug support.

Certain sources of debug event require no extra information to specify when the debug event should be raised. For example, the debug events caused by the execution of the debug instruction or the asserting of the external break pin 11a. However, the debug events which are generated from a programmable combination of the debug triggers require the precise criteria which is used to determine which combination of active debug triggers generate a debug event to be provided. This information is provided in the upper 19 bits of the associated debug control register.

The data processing unit according to the present invention allows one debug event to be associated with each entry in the protection range table defined by the register pair 15, 16; 17, 18. For example, debug control register TRnEVT allows the debug triggers produced by entry n in the protection range table, code and data, to be included into the trigger criteria. The use of the other debug triggers is not restricted. Some of the triggers from the protection system 12 can be logically OR'd together by OR-gates 20, 21, and 22 before they are used as inputs to debug event generation logic.

The upper bits of the TRnEVT-register may have the following content:

TABLE 4

| Field | Bits | R | W | Description |
|---|---|---|---|---|
| see table 3 | 12-0 | 3 | 3 | |
| — | 15-13 | — | — | not used |
| DLR_LR | 16 | 3 | 3 | Controls combination of $D_{LR}$ and $C_{LR}$ |
| DLR_U | 17 | 3 | 3 | Controls combination of $D_{LR}$ and $C_U$ |
| DU_LR | 18 | 3 | 3 | Controls combination of $D_U$ and $C_{LR}$ |
| DU_U | 19 | 3 | 3 | Controls combination of $D_U$ and $C_U$ |
| GPR_LR | 20 | 3 | 3 | Controls combination of $G_{PR}$ and $C_{LR}$ |
| GPR_E | 21 | 3 | 3 | Enable debug event generation from GPR input |
| | 31-22 | | | not used |

The debug event generation logic 28a allows the debug triggers to be combined to produce the following types of breakpoints. FIG. 3 shows the three different kinds of breakpoint generators:

PC only breakpoints, unit 31

Break on data access to an address which may also be conditional on the PC, unit 30

Break on the write back to a specific GPR, which may also be conditional on the PC, unit 32

The debug event generation logic can be broken down into several blocks, each block implements one of the above types of breakpoints. Unit 30 is coupled with lines 23, 24, 25, and 26. Unit 31 is coupled with lines 25 and 26, and unit 32 is coupled with lines 25, 26, and 27. The outputs of units 30, 31, and 32 are OR'd together by means of OR gate 33. The output of OR gate 33 is coupled with output line 29.

FIGS. 4 to 6 show different embodiments of the units 30, 31 and 32 of FIG. 3. An embodiment for unit 30 is shown in FIG. 4. The embodiment comprises a NOR gates 42 and an OR gate 45 and three AND gates 43, 44, and 46. A terminal 40 is connected to the first inputs of NOR gate 42 and of AND gate 44. A terminal 41 is connected to the second input of NOR gate 42 and to the first input of AND gate 43. Line 26 is coupled with the second input of AND gate 43 and line 25 is coupled with the second input of AND gate 44. OR gate 45 comprises three inputs which are connected to the outputs of gates 42, 43, and 44. The output of OR gate 45 is coupled with a first input of AND gate 46. The output of gate 46 is coupled with an output terminal 47. In a first application, signal DU_U from the TRnEVT-register 28c is fed to terminal 40 and signal DU_LR to terminal 41. The second input of AND gate 46 is coupled with line 23. The generation of a debug event from the $D_U$ trigger input on line 23 is controlled by three bits in the TRnEVT-register 28c. The $D_U$ input can be combined with the $C_U$ and $C_{LR}$ inputs to provide to the following types of breakpoints:

Break on the data access of a specific address,

Break on the data access of a specific address by an instruction whose PC is defined in either the upper or lower bounds register 15,16; 17,18 of the corresponding code protection table entry, Break on the data access of a specific address by an instruction in the code range defined by the corresponding code protection table entry.

In a similar way, the generation of a debug event from the DLR trigger input from the protection system is controlled by another three bits in the TRnEVT register. In this case, signal DLR_U is fed to terminal 40 and signal DLR_LR to terminal 41. The second input of AND gate 46 is coupled with line 24. The $D_{LR}$ input can be combined with the $C_U$ and $C_{LR}$ inputs to provide to the following types of breakpoints:

Break on the data access of a specific address or range,

Break on the data access of a specific address or range by an instruction whose PC is defined in either the upper or lower bounds register of the corresponding code protection table entry, Break on the data access of a specific address or range by an instruction in the code range defined by the corresponding code protection table entry, FIG. 4 shows an embodiment for unit 32 of FIG. 3. a terminal 50 is coupled with an input of an inverter 51 and the first input of an AND gate 53. The second input of AND gate 53 is connected to line 26. Outputs of gates 51 and 53 are OR'd together by OR gate 52 whose output is coup0led with the first input of AND gate 55. The second input of gate 55 is connected to line 27. Output of gate 55is coupled with the first input of AND gate 56 whose second input is connected to terminal 54. The output of gate 56 is coupled with an output terminal 57.

Signal GPR_LR is fed to terminal 50 and signal GPR_E to terminal 54. The generation of a debug event from the GPR write back guard trigger input is controlled by two bits. It can be combined with the $C_U$ and $C_{LR}$ inputs to produce the following type of breakpoint:

Break on the write to a specific general purpose register (GPR),

Break on the write to a specific GPR by an instruction in the code range defined by the corresponding code protection table entry.

FIG. 6 shows an embodiment of unit 31 of FIG. 3. A terminal 60 and a terminal 61 are connected to first and second inputs of NAND gate 62 whose output is coupled with the first input of AND gate 63. The second input of gate 63 is connected with line 25. Terminals 69, 70, and 71 are connected to three inputs of NOR gate 64, respectively. The output of NOR gate 64 is connected to the first input of an AND gate 65 whose second input is coupled with line 26. The outputs of gates 63 and 65 are OR'd together by OR gate 67 whose output is connected to terminal 68.

Signal DLR_U is fed to terminal 60 and signal DU_U to terminal 61. GPR_LR is fed to terminal 69, signal DLR_LR to terminal 70, and signal DU_LR to terminal 71. This implementation provides the following breakpoint criteria's:

Break on PC match with either lower or upper,

Break on PC with in range specified by upper and lower.

The debug status register in the debug/trace module 11 contains several pieces of information about the current status of the on chip debug system shown in table 5:

TABLE 5

| 12 8 | 7 | 6 | 5 | 4 | 3 | 2 | 1 | 0 |
|---|---|---|---|---|---|---|---|---|
| EVENT SOURCE | POSTED EVENT | LAST SYSTEM DEBUG LEVEL | | SYSTEM DEBUG LEVEL | | RESTART | Halt | debug enabled |

Bit 0 indicates whether the debug support is enabled, bit 1 indicates whether the CPU 7 is in the halt state, bit 2 causes a restart of the CPU if it is set to "1", bits 3 and 4 indicate the current system debug level, bits 6 and 7 indicate the previous value of system debug level prior to the last debug event which caused the CPU 7 to enter software debug mode or halt, bit 7 indicates whether the last debug software event was posted, and bits 8 to 12 store the source of the last debug event.

This register can be read and written through the external debug port by means of an external debug hardware 4. The external debug port provides the following functionality:

An external emulator hardware has internal access through the system bus 13 and can inspect all internal and external address, for example if the CPU is halted.

The external hardware can communicate with a debug monitor or kernel,

All transactions can be initiated and controlled by the external host.

The debug port might have two connections, on the one side is the internal bus 13 which connects the debug port to the rest of the on-chip system and on the other side is a JTAG connection to the emulator hardware 4.

As embedded application get more complex and migrate into the range of high speed processors, runtime protection becomes justified by two main considerations: easier debugging, with a consequent edge in time to market, and the ability to protect critical system functions in the presence of errors that may have slipped through testing of complex but less critical functions. The data processing unit according to the present invention meets both requirements minimizing the required hardware to provide these functions.

What is claimed is:

1. Data processing unit with debug capabilities, comprising a central processing unit, a bus coupled with the central processing unit to access a device via address and data lines coupled with said bus, a debug unit being coupled to said bus, a protection unit coupled with said debug unit for protecting access on said bus, whereby said protection unit comprises registers which define at least one programmable address range and said protection unit being programmable to operate in a protecting mode in which said address range is protected and in a debug mode in which after access to said address range a signal is sent to said debug unit, whereupon said debug unit generates a debug signal.

2. Data processing unit as in claim 1, wherein said protection unit is coupled to said bus to check access signals on said bus.

3. Data processing unit as in claim 1, wherein said protection unit is coupled with said central processing unit to check access signals of said central processing unit.

4. Data processing unit as in claim 1, wherein said data processing unit further comprises an external pin coupled with said debug unit, and said debug signal is accessible at said external pin.

5. Data processing unit as in claim 1, wherein said central processing unit comprises an interrupt input, and said debug signal is fed to said interrupt input.

6. Data processing unit as in claim 5, wherein said central processing unit further comprises an interrupt controller coupled with said interrupt input, and said debug signal is fed to said interrupt controller.

7. Data processing unit as in claim 1, further comprises means to halt said central processing unit upon said debug signal.

8. Data processing unit as in claim 1, wherein said protection unit comprises a data comparator for comparing data transferred on said bus with predefined data.

9. Data processing unit as in claim 1, wherein said protection unit comprises an address comparator for comparing an address transferred on said bus with a predefined address.

10. Data processing unit as in claim 9, wherein said protection unit further comprises a data comparator for comparing data transferred on said bus in association with said address with predefined data.

11. Data processing unit as in claim 9, wherein said protection unit further comprises a data comparator unit which compares whether data transferred on said bus in association with said address lies within a predefined data range.

12. Data processing unit as in claim 1, wherein said protection unit comprises a comparator unit which compares whether an address transferred on said bus lies within a predefined address range.

13. Data processing unit as in claim 12, wherein said protection unit further comprises a data comparator for comparing data transferred on said bus in association with said address range with predefined data.

14. Data processing unit as in claim 12, wherein said protection unit further comprises a data comparator unit which compares whether data transferred on said bus in association with said address range lies within a predefined data range.

15. Data processing unit as in claim 5, further comprising an external pin coupled with said debug unit, wherein upon a signal at said external pin said debug unit generates said debug signal.

16. Data processing unit as in claim 6, wherein said debug unit comprises a programmable debug register which stores a priority for said interrupt.

* * * * *